(12) United States Patent
Kaiwa et al.

(10) Patent No.: US 7,983,947 B2
(45) Date of Patent: Jul. 19, 2011

(54) METHOD AND APPARATUS FOR ASSISTING POSITIONAL INFORMATION SERVICE

(75) Inventors: Masahiro Kaiwa, Funabashi (JP);
Kenichi Shima, Yokosuka (JP); Yoichi Tanibayashi, Fujisawa (JP); Hiroyuki Yamamoto, Yokohama (JP); Mioko Chikamori, Tokyo (JP); Seigo Teramachi, Kashiwa (JP); Aki Kariya, Ichikawa (JP)

(73) Assignee: NTT DoCoMo, Inc., Tokyo (JP)

( * ) Notice: Subject to any disclaimer, the term of this patent is extended or adjusted under 35 U.S.C. 154(b) by 3650 days.

(21) Appl. No.: 10/070,331

(22) PCT Filed: Jul. 2, 2001

(86) PCT No.: PCT/JP01/05709
§ 371 (c)(1),
(2), (4) Date: Feb. 26, 2002

(87) PCT Pub. No.: WO02/03735
PCT Pub. Date: Jan. 10, 2002

(65) Prior Publication Data
US 2002/0156646 A1    Oct. 24, 2002

(30) Foreign Application Priority Data
Jun. 30, 2000    (JP) .................................. 2000-199667

(51) Int. Cl.
*G07G 1/14* (2006.01)
(52) U.S. Cl. ........................................................ 705/14
(58) Field of Classification Search ...................... 705/14
See application file for complete search history.

(56) References Cited

U.S. PATENT DOCUMENTS

| | | | |
|---|---|---|---|
| 5,548,296 A | | 8/1996 | Matsuno |
| 5,933,811 A | * | 8/1999 | Angles et al. .................... 705/14 |
| 5,948,040 A | * | 9/1999 | DeLorme et al. ............. 701/201 |
| 6,259,405 B1 | * | 7/2001 | Stewart et al. ................. 342/457 |
| 6,587,835 B1 | * | 7/2003 | Treyz et al. ..................... 705/14 |
| 6,677,894 B2 | * | 1/2004 | Sheynblat et al. .......... 342/357.1 |
| 7,024,205 B1 | * | 4/2006 | Hose .......................... 455/456.1 |
| 7,047,019 B1 | * | 5/2006 | Cox et al. .................... 455/456.1 |
| 2001/0014911 A1 | * | 8/2001 | Doi et al. ....................... 709/221 |
| 2002/0046084 A1 | * | 4/2002 | Steele et al. .................... 705/14 |
| 2002/0052684 A1 | * | 5/2002 | Bide ............................. 701/200 |
| 2002/0077130 A1 | * | 6/2002 | Owensby ...................... 455/466 |

FOREIGN PATENT DOCUMENTS

| | | |
|---|---|---|
| GB | 2 344 024 A | 5/2000 |
| JP | 6-165246 | 6/1994 |
| JP | 7-111675 | 4/1995 |
| JP | 11-88521 | 3/1999 |
| JP | 11-272698 | 10/1999 |
| JP | 2000-102058 | 4/2000 |
| JP | 2000-106688 | 4/2000 |
| WO | WO 98/00988 | 1/1998 |
| WO | WO 99/45533 | 9/1999 |
| WO | WO 99/46948 | 9/1999 |
| WO | WO 00/30396 | 5/2000 |

* cited by examiner

*Primary Examiner* — Arthur Duran
(74) *Attorney, Agent, or Firm* — Brinks Hofer Gilson & Lione

(57) ABSTRACT

Service support gateway 1 is connected to network 2. Service provider 3 having ASP 31 and CP 32 provides a service relating to location of locating target person 4 by using network 2. Service supporting gateway 1 provides service provider 3 with a service of obtaining location information indicating the location of locating target person and a service of sending the location information to a specified destination.

25 Claims, 12 Drawing Sheets

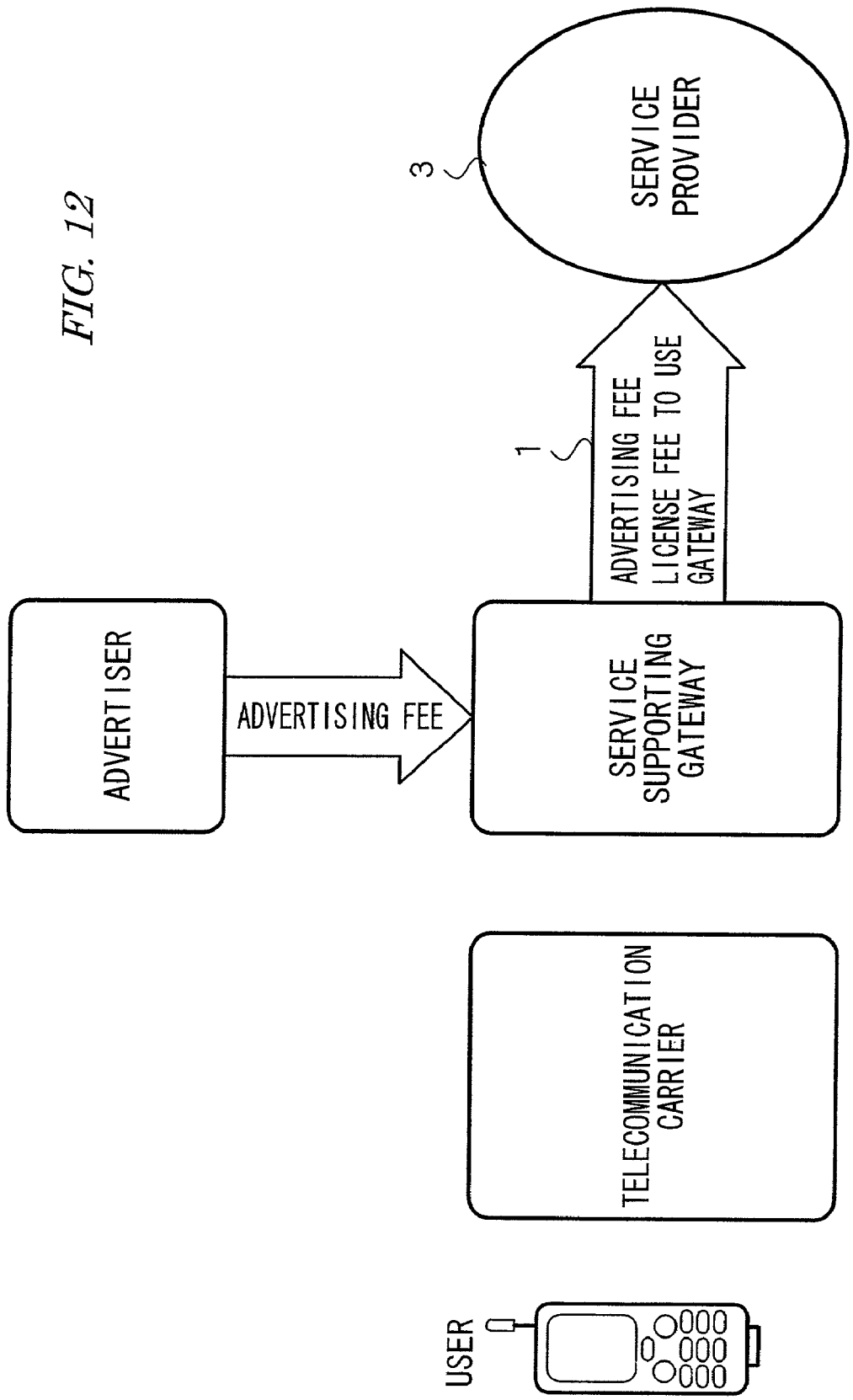

METHOD AND APPARATUS FOR ASSISTING POSITIONAL INFORMATION SERVICE

TECHNICAL FIELD

The present invention relates to a method and an apparatus for supporting services which various service providers provide in relation to the location of a locating target person by using a network.

BACKGROUND ART

With the spread of various kinds of mobile devices such as a mobile phone, various services using mobile devices are available. One such service is a location information service providing a service relating to the current location of a locating target person who may be or may not be a user of this service. This location information service is for example a current location searching service of a PHS phone, a current location searching service of locating a locating target person such as a senior person or a child, and a service of delivering information relating to the current location.

To carry out this kind of location information service, it is necessary to locate the current location of the locating target person. This location is usually conducted by giving a locating target person a mobile device such as a mobile terminal, a Personal Handy-phone System (PHS) phone, or a Personal Digital Assistant (PDA) with GPS function and by exchanging signals for locating between a location device and the mobile device.

However, the locating methods differ depending on the mobile devices of locating target persons. Hence, location information service providers at present are able to provide a location information service to only locating target persons having a particular kind of mobile device. Therefore, to provide location information service to many locating target persons having various kinds of mobile device, a service provider has to prepare location means for various mobile devices; this increases costs for providing location information service. Also, there are cases where necessary representing format of location information is different depending on the content of the location information service. For example, location information expressed by latitude and longitude is preferable when providing one kind of service, and location information expressed by address (character string) is preferable when providing another kind of service. In this case, the service provider has to have means for generating location information with suitable representing format for each service.

As described above, provision of location information services places a great burden on service providers.

Although the contents of service provided by various service providers are different, there are only limited kinds of obtaining methods for location information necessary to service providers, and it is conceivable that there are many methods that can be shared by service providers. However, service providers install facilities for obtaining and managing location information of users, resulting in investing in the same facilities.

DISCLOSURE OF INVENTION

Hence, it is economically preferable on the whole to release the service providers from these processes such as obtaining and managing location information that can be shared by other service providers, and to let the service providers focus on providing various services by using location information. This can result in promoting free and fair competition among service providers, and consequently various location information services according to preferences of the users can be provided. The present invention is made in accordance with the above idea, and has an objective of providing a location information service supporting method and a location information service supporting gateway that can release service providers from the burden of obtaining and managing location information and can promote a provision of various location information service.

To achieve this object, the present invention provides a location information service supporting method comprising: a location information obtaining service in which a location information service supporting gateway is situated between a first network including a mobile network and a second network obtains a location information indicating the location of a locating target person via the first network and a mobile device accompanied with the locating target person so that a service provider provides a service relating to the location of the locating target person; and a location information sending service in which the location information service supporting gateway sends the location information to a destination designated by the service provider via the first or the second network.

In the location information service supporting method, a main supporting task is carried out by the location information service supporting gateway situated between a first network including a mobile network and a second network. The location information service supporting gateway is able to obtain, on behalf of the service provider, the location information of a locating target person who is difficult to be located by using the first network. Then the location information service supporting gateway sends the thus obtained location information to a destination designated by the service provider. By this supporting task, the service provider can conduct its location information service without a burden of obtaining and managing the location information.

In the location information sending service, the location information service supporting gateway may send the location information to the service provider itself. Also, the second network may include a mobile network. In this case, in the location information sending service, the location information may be sent to a destination designated by the service provider via the mobile network.

In a preferred form, on behalf of the service provider, the location information service supporting gateway certifies a locating target person or a person who receives a service. Also, on behalf of the service provider, the location information service supporting gateway may determine if locating a locating target person is possible.

In another preferred form, in the location information sending service, the location information service supporting gateway changes the format of the location information into a format suitable for a service that uses the location information, and sends to a service provider that provides this service.

Also, in another preferable form, the location information service supporting gateway accumulates, for each of the service, the amount of task processes incurred due to the provision of the service, and collects a service charge according to the amount of the processes from at least one of the service provider that provides the service, the locating target person, or a target person of service by the service provider.

Also, in another preferable form, at least one of the location information service supporting gateway or a communication carrier that provides a wireless communication service to the mobile device collects a service charge on behalf of the service provider who provides the service.

Also, in another preferable form, the location information service supporting gateway provides an advertisement to a mobile device accompanying the locating target person, collects fee for the advertisement from the advertiser, and pays to the service provider the advertisement fee as all or a part of a service charge for service by the service provider.

In a preferred form, the location information obtaining service comprises: a step for determining an appropriate locating method for a mobile device accompanied by the locating target person; a step for ordering to locate the locating target person to a locating means which locates in a determined locating method; and a step for obtaining the location information sent from the locating means in response to the ordering.

In this form, the location information service supporting gateway may accumulate the amount of task processes incurred due to the locating, collect service charges according to the amount of the task processes from at least one of the locating target persons or a target person of the service, and pay the service charge to a manager of the locating means.

Also, it is possible that at least one of the location information service supporting gateway or a communication carrier that provides a wireless communication service to the mobile device collects, on behalf of a manager of the locating means, a locating fee for location by the locating means.

In a preferable form, the location information service supporting gateway carries out the location information obtaining service and the location information sending service on a schedule determined in advance.

In another preferable form, the location information service supporting gateway periodically carries out the location information obtaining service to acquire a moving direction and a moving speed of the locating target person, and, in the location information sending service, sends the moving direction and the moving speed together with the location information.

In another preferable form, in the location information sending service, the location information service supporting gateway checks the reaching of location information to a destination and sends a reaching notification to a mobile device of the locating target person.

The present invention also provides a location information service supporting gateway situated between a first network including a mobile network and a second network, the gateway comprising: a location information obtaining means for obtaining a location information indicating the location of a locating target person via the first network and a mobile device accompanied with the locating target person so that a service provider provides a service relating to the location of the locating target person; and a location information sending means for sending the location information to a destination designated by the service provider via the first or the second network.

In a preferable form, a location information service supporting gateway further has a means for certifying a locating target person or a person who receives a service on behalf of the service provider.

In another preferable form, a location information service supporting gateway further has a means for changing the format of the location information into a format suitable for a service that uses the location information.

In another preferable form, the location information obtaining means determines an appropriate locating method suitable for a mobile device accompanied with the locating target person, and orders the location of the locating target person to a locating means that locates according to a determined locating method.

In another preferable form, a location information service supporting gateway further comprises an accumulating means for determining at least one of the amount of processes accumulated due to obtaining location information by the location information obtaining means or due to sending location information by the location information sending means; and a collecting means for collecting a service charge according to the amount of accumulated processes from at least one of the service providers, the locating target person, an owner of the locating means, or a target person of the service.

BRIEF DESCRIPTION OF THE DRAWINGS

FIG. 12 is a diagram showing the third method for collecting service charge used in the location information service supporting system of the embodiment.

BEST MODE OF CARRYING OUT THE INVENTION

With reference to the drawings, embodiments of the present invention will be described. Note that following embodiments are only examples of the present invention, and the present invention can have various forms within the scope of its technical idea.

A. Location Information Service Supporting System

A-1, Entire Configuration

Figure 1:
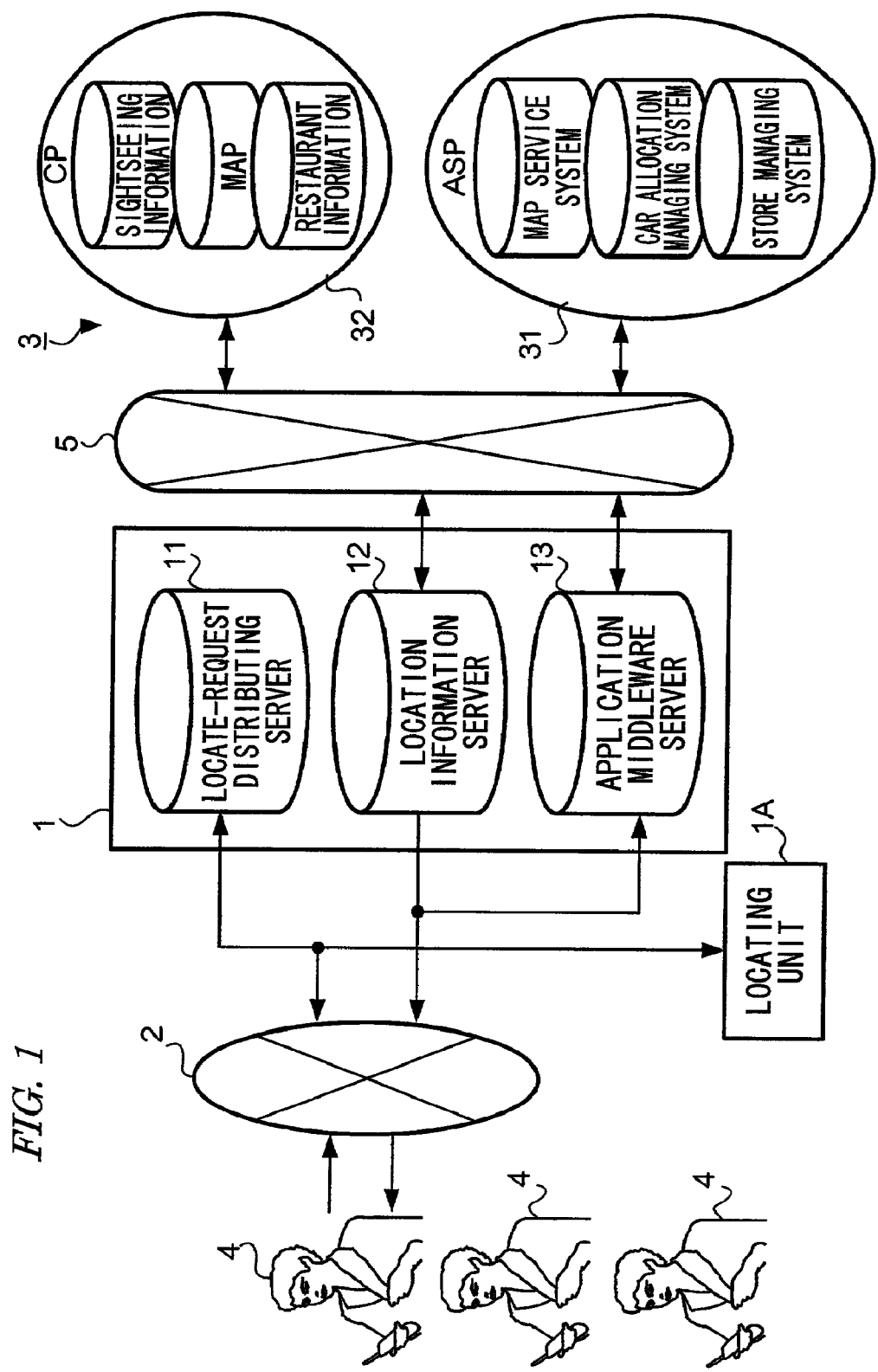
FIG. 1 is a block diagram showing the entire configuration of the location information service supporting system of an embodiment of the present invention.

FIG. 1 is a block diagram showing the entire configuration of the location information service supporting system according to this embodiment. As shown in the figure, the location information service supporting system is essentially comprised of a service supporting gateway 1, a network 2 such as a mobile communication network or a fixed network, a service provider 3, and a locating target person 4.

Service provider 3 is one of various organizations that provide location information service relating to the current location of locating target person 4 by using network 2. Service provider 3 includes an Application Service Provider (ASP) 31 that has an application software for, for example, a map service system, a car allocation managing system, and a store managing system and uses them for client corporations, and a Content Provider (CP) 32 that conducts an information delivery service relating to the user's current location such as sightseeing information, map information, and restaurant information.

Service supporting gateway 1 is connected to the first network 2 that includes a mobile network and to service provider 3 via the second network 5. The second network 5 can be a network or a private line such as the Internet. Service supporting gateway 1 relays data between networks. Service supporting gateway 1 also obtains and manages location information necessary for location information service provided by service provider 3.

Configuration of service supporting gateway 1 will be described in detail below.

As shown in FIG. 1, service supporting gateway 1 has a locate-request distribution server 11, a location information server 12, and an application middleware server 13. Also, a locating unit 1A is connected to service supporting gateway 1.

Locating unit 1A is a means for measuring the current location of locating target person 4. In this embodiment, locating target person 4 has to have a mobile device to receive location information service relating to the current location of locating target person 4. Locating unit 1A measures the current location of locating target person 4 in cooperation with the mobile device held by locating target person 4.

In this explanation, each locating target person 4 carries a mobile device such as a mobile phone, a Personal Handy-phone System (PHS) phone, or a portable device like a Personal Digital Assistant (PDA) with a function of Global Positioning System (GPS). Depending on the mobile device, a method of measuring the current location of the locating target person (a procedure for obtaining the current location) differs. Therefore, locating unit 1A has various means for these locating methods. Note that locating unit 1A may be a separate unit from service supporting gateway 1, or may be a part of service supporting gateway 1.

To receive location information service relating to his or her current location, locating target person 4 sends locate-request to service supporting gateway 1 by using his or her mobile device. Depending on the location information service, this locate-request is sent to service supporting gateway 1 from service provider 3. Locate-request distribution server 11 in service supporting gateway 1 is a means for distributing locate-request sent as this to a locating means of locating unit 1A suitable to the mobile device of locating target person 4.

Location information server 12 is a means that manages the location information of locating target person 4 obtained by locating means of locating unit 1A and provides the location information to user or service provider 3 and so on who desires these information. In more detail, location information server 12 stores temporarily the location information sent from locating unit 1A, changes the representing format of the location information into a representing format suitable to processes conducted by a user or to service provider 3, and provides to the user or service provider 3. For example, location information server 12 has a function of changing a location information expressed by latitude and longitude into a location information expressed by address.

Note that a user here is a person who receives a service provided by service provider (that is, a person aimed at for the service), can be a locating target person himself, or can be another person depending on the service.

Application middleware server 13 is a means for conducting, on behalf of service provider 3, processes such as user authentication or charging processes necessary when service provider 3 provides user with location information service.

Service supporting gateway 1 uses these means to conduct service supporting tasks such as obtaining, managing and providing user's location information, verifying user, and charging a user for service provider 3 of location information service. Service provider 3 receives the location information service supporting tasks and provides users with various location information services, and gets service charge for it.

Owner of service supporting gateway 1 receives service charge for location information supporting tasks from service provider 3 or users.

These are overall pictures of location information service supporting systems of the embodiment.

B. Various Forms of the Location Information Service

FIGS. 2 to 5 show various forms of the location information service provided by service provider 3 with support of service support gateway 1. These services will be described below.

Figure 2:
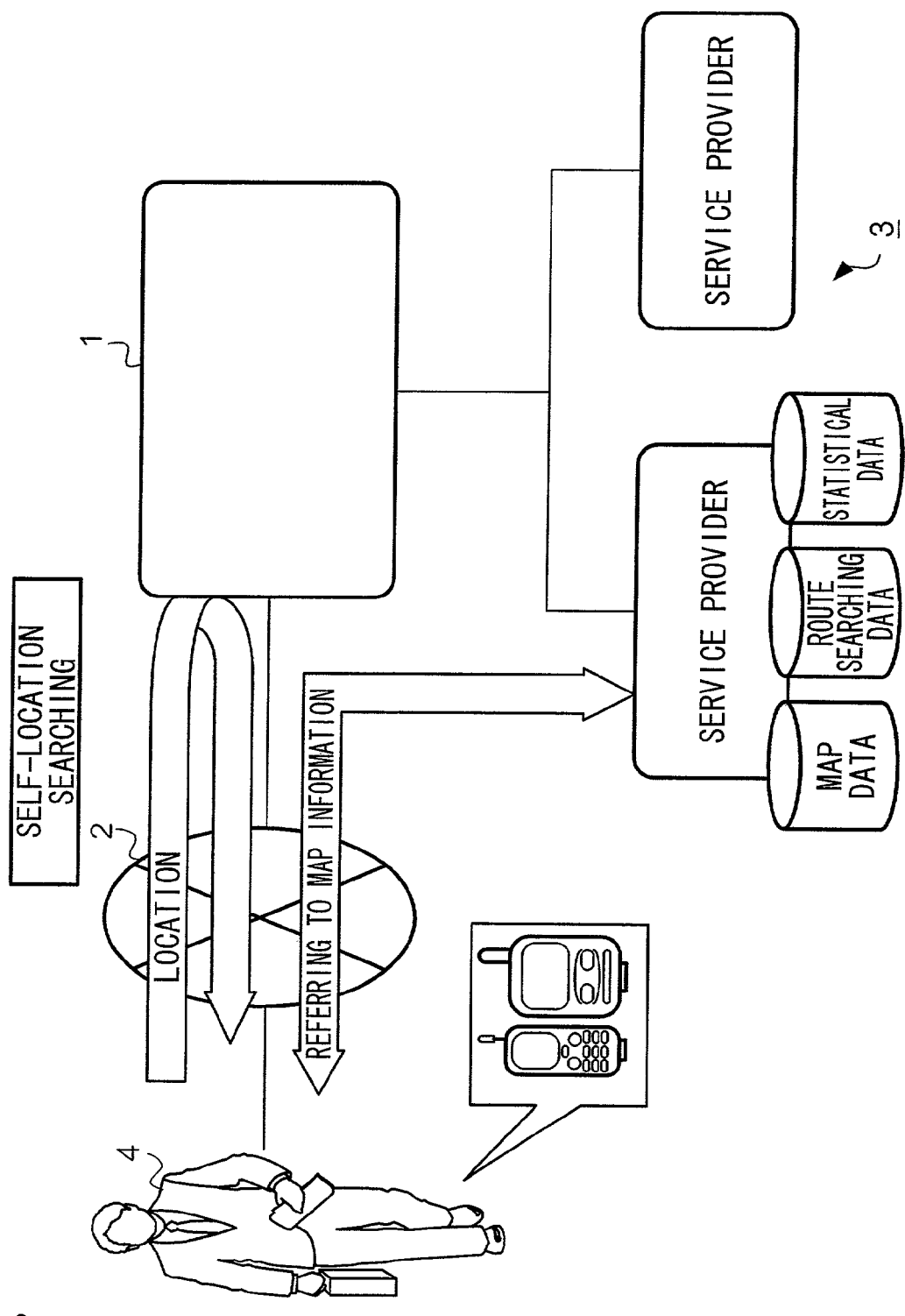
FIG. 2 is a diagram showing one form of self-location searching service provided by the embodiment.

B-1. Self-Location Searching Service (FIG. 2)

First, a service form called self-location searching service will be described.

This self-location searching service is a location information service that provides a user (locating target person 4)—for example a pedestrian—with his or her current location, with information about the vicinity of the current location, or route from the current location to his or her destination after searching it.

This self-location searching service is provided, for example, as follows.

First, a user wishing a self-location searching service calls and sends locate-request to service supporting gateway 1 via network 2 by using his or her mobile device.

Locate-request distribution server 12 in service supporting gateway 1 receives the locate-request and determines the type of mobile device (for example, mobile device with GPS function, PHS phone, or a mobile packet terminal), and then sends the locate-request to a locating means among the locating means of locating unit 1A suitable for the determined type of the mobile device. As a result, the locating means and user's mobile device exchange signals for obtaining location information, whereby locating processes is carried out.

To give an example, if a user's mobile device is a PHS phone, and a locating means calls the PHS phone via network 2, the paging signals are sent to the PHS phone via the base station of the PHS phone which is in its service area. The PHS phone sends the identification information of the base station included in the paging signals back to the locating means. The locating means changes the identification information of the base station into location information (for example latitude-longitude information).

Also, in a case where a user's mobile device is, for example, a portable phone with a GPS function, when a locating means pages the portable phone via network 2, the portable phone sends the current location information expressed by latitude and longitude obtained by its GPS function back to the locating means. The locating means uses differential information of latitude-longitude information obtained by Differential Global Positioning System (DGPS), corrects the latitude-longitude information received from the portable phone, and generates location information.

Location information server 12 of service supporting gateway 1 stores the obtained location information and sends the location information to the user's mobile device or service provider 3 giving location information service. In this case, when there is a need for changing the representing format of the location information into the one suitable to processes of service provider 3, location information server 12 does so to send it. As a result, a user can know his or her own location, and service provider 3 can send to the user's mobile device information relating to the location information such as a map data around the current location indicated by the location information.

Note that service supporting gateway 1 is also able to obtain location information of a mobile device without paging it. For example, when a portable phone with a GPS function is used and when the portable phone sends to service supporting gateway 1 a locate-request together with the latitude-longitude information obtained by its GPS function, service supporting gateway 1 can obtain latitude-longitude information without paging portable phone. Also, if a mobile device includes, in a paging signal used when paging service supporting gateway 1 via network 2, an identification information of the base station with which the mobile device communicates, service supporting gateway 1 is able to obtain the location information without paging a portable phone even if the portable phone is a PHS phone or a portable phone without a GPS function.

Figure 3:
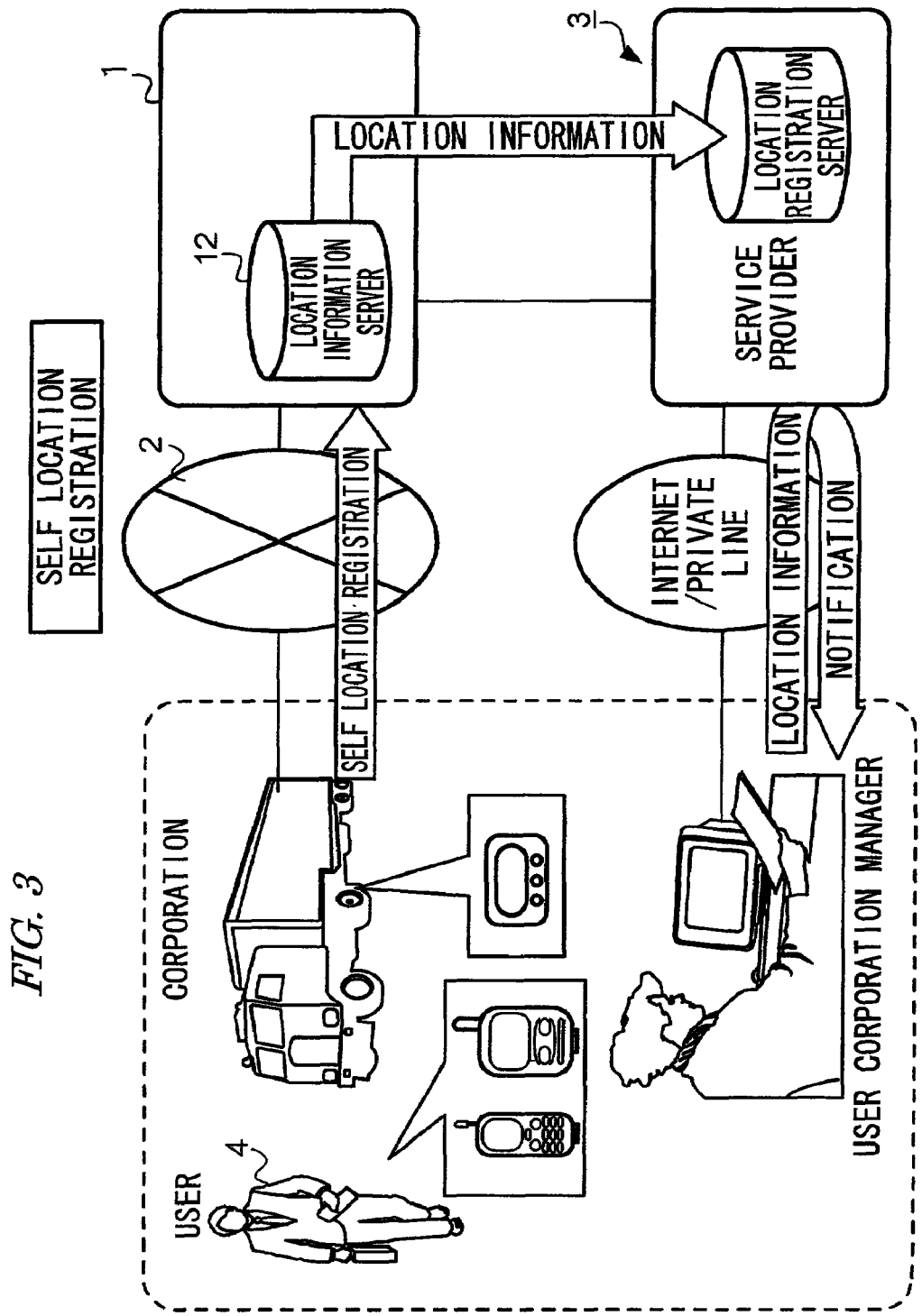
FIG. 3 is a diagram showing one form of self-location registration service provided by the embodiment.

B-2. Self-Location Registration Service (FIG. 3)

Next, a service form called self-location registration service will be described.

This self-location registration service is a location information service in which location information server 12 of service supporting gateway 1 obtains and stores periodically the location information from, for example, a corporate employee (locating target person 4) and notifies it to a manager (user) of the corporation.

This self-location registration service is given for example as follows.

First, a portable phone with a GPS function held by a corporate employee or a communication terminal with a GPS function equipped in a car driven by a corporate employee periodically pages service supporting gateway 1 and sends locate-request and registration request of self-location.

Each time service supporting gateway 1 receives the locate-request and registration request of self-location, it obtains the location information of the corporate employee and saves it on location information server 12. These processes are the same as described in the explanation for the self-location searching service; hence the explanation for them is not given.

Each time service supporting gateway 1 receives the locate-request and registration request of self-location, it determines service provider 3 from the terminal identifier (call number) of the mobile device sending these requests, and sends to service provider 3 the location information of the corporate employee. In this process, when there is a necessity of changing the representing format of the location information into the one suitable for the process of service provider 3, location information server 12 does so and sends the location information.

Service provider 3 stores the location information of all employees of the corporation sent as this into its location registration server. When service provider 3 receives a request from a manager of the corporation, it retrieves the location information from the location information server and sends it to the manager.

Note that service supporting gateway 1 may store location information on corporate employees on behalf of service provider 3. In this case, a service given by service provider 3 is for example as follows; overlapping a map on the location information stored in service supporting gateway 1 for an easy use to corporate manager, and sending it to corporations.

Also, instead of sending location information by service supporting gateway 1 to service provider 3 (a so-called push type information delivery), service provider 3 may obtain location information from service supporting gateway 1 (a so-called pull type information delivery).

Figure 4:
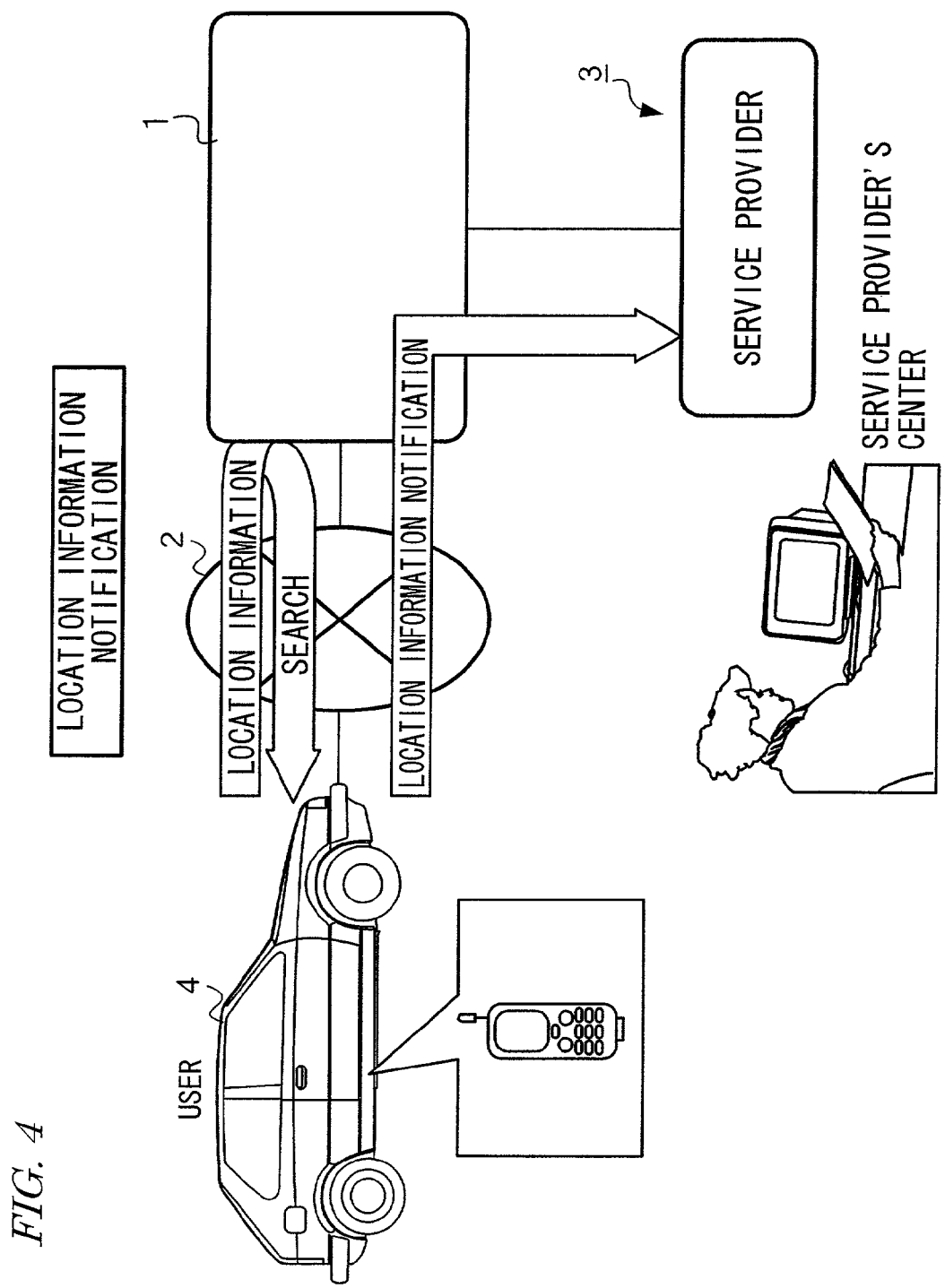
FIG. 4 is a diagram showing one form of self-location notification service provided by the embodiment.

B-3. Self-Location Notification Service (FIG. 4)

Next, a service mode called self-location notification service will be described.

This self-location notification service is a location information service such as the current location of a user (locating target person 4) is immediately notified to an emergency center at the time of an emergency such as incident and an emergency service is contacted.

This self-location notification service is provided for example as follows.

First, a user who subscribes to this self-location notification service makes a call and sends a locate-request by his or her mobile device to service supporting gateway 1 via network 2 when, for example, an engine trouble stops his or her car.

When service supporting gateway 1 receives the locate-request, it obtains the location information of the user, and stores it in location information server 12. These processes are the same as described in the explanation for the self-location searching service; hence the explanation for them is not given.

Next, service supporting gateway 1 transmits the location information to the mobile device that sent the locate-request. The location information is received by the mobile device and displayed on the display of the mobile device. Also, the mobile device sends the location information and self-location notification request to service supporting gateway 1.

When service supporting gateway 1 receives the location information and self-location notification request, it determines service provider 3, the provider of this self-location notification service, by using a terminal identifier (call ID) of the mobile device that sent them. Then service supporting gateway 1 sends the location information of the user to service provider 3. When sending location information, service supporting gateway 1 changes the representing format of location information if it is necessary to do so for conforming the representing format to the process of service provider 3.

Service provider 3 sends thus-sent location information of the user to a service provider's center that gives a service such as a car allocation. The staff of the service provider's center determines the current location of the user who has trouble because his or her car fails to move, and the staff goes to the location to solve the trouble.

Note that a mobile device may or may not display the location information sent from service supporting gateway 1. Also, the mobile device may send the location information to service supporting gateway 1 without displaying.

Also, in the above explanation, service supporting gateway 1 sends location information to service provider 3 after sending it to the mobile device. This is in order to get permission from the user about sending his or her location information to the service provider. However, if there is already an agreement that it is not necessary to gain the user's permission to send his or her location information, service supporting gateway 1 may send the location information to service provider 3 without sending it to the mobile device.

Figure 5:
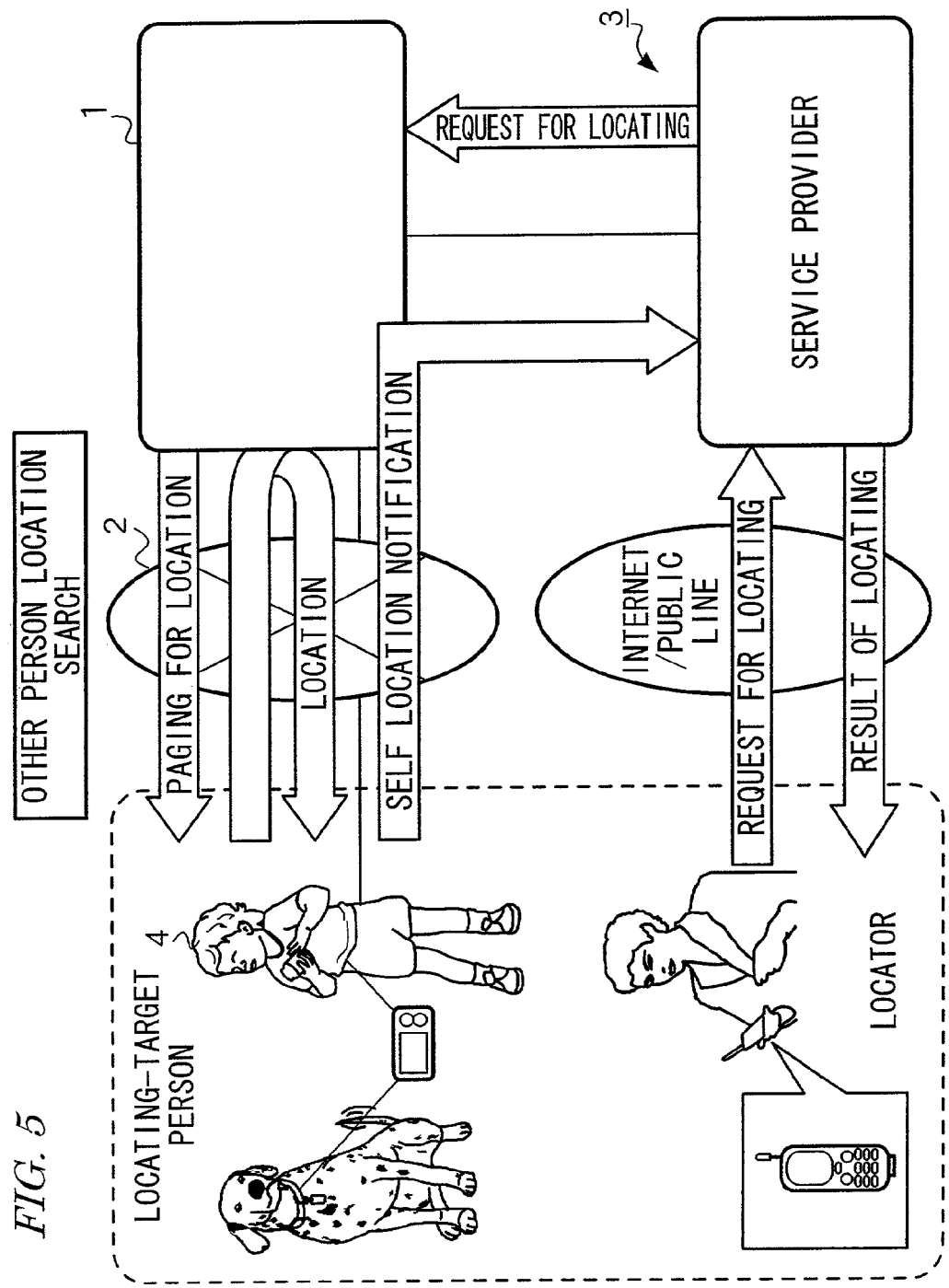
FIG. 5 is a diagram showing one form of other person's location searching service provided by the embodiment.

B-4. Other Person's Location Searching Service (FIG. 5)

Next, a service form called other person's location searching service will be described.

This other person's location searching service is a service that provides a parent, a user, with the current location of locating target person such as his or her child, pet, or senior person.

This other person's location searching service is provided for example as follows.

First, when a user, a parent, who subscribes the other person's location information search service wants to know the current location of his or her child (a locating target person), the user calls service provider 3 through some kind of communication means and sends a search request.

For all users of the other person's location searching service, service provider 3 stores identifiers of mobile devices of their locating target persons. When service provider 3 receives a search request, it retrieves the identifier of the mobile device of the locating target person of the user who sent the search request and sends the identifier and the search request to service supporting gateway 1.

When service supporting gateway 1 receives the locate-request and the identifier of the mobile device, service supporting gateway 1 pages the mobile device of the locating target person by using the identifier of the mobile device to obtain the location information and store it in location information server 12. These processes are the same as described in the explanation for the self-location searching service; hence the explanation for them is not given. However, since the mobile device is not communicating with service supporting gateway 1 at this time, it is impossible to use the above-mentioned method in which location of the locating target person is carried out without paging the mobile device.

Next, service supporting gateway 1 sends the location information about the locating target person to service provider 3 that sent the locate-request. In this case, if it is necessary to change the representing format of the location information into the one suitable for processes at service provider 3, location information server 12 does so before sending the location information.

Service provider 3 sends thus-sent location information of the locating target person to the user as a search result.

C. Function of Service Supporting Gateway

FIGS. 6 to 9 show details of service supporting tasks executed by service supporting gateway 1 for each of the above location information services.

C-1. Service Supporting Tasks for Self-Location Searching Service (FIG. 6)

Figure 6:
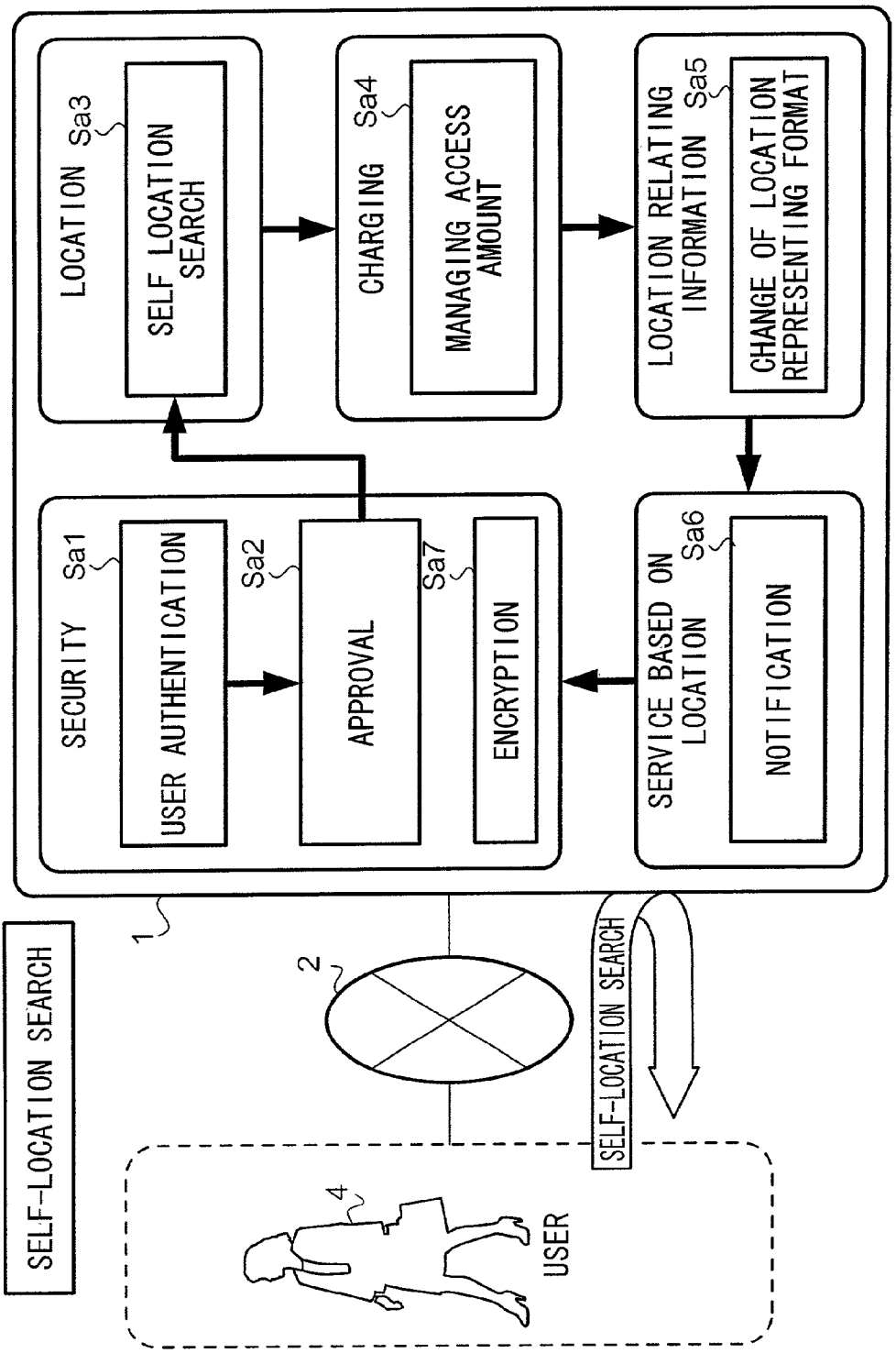
FIG. 6 is a diagram showing details of service supporting tasks in the self-location searching service provided by the embodiment.

FIG. 6 shows service supporting tasks executed by service supporting gateway 1 when a service provider 3 provides its user (or locating target person) with a certain service (named here as service W) belonging to location information searching service. This service supporting tasks includes the following processes.

STEP Sa1: User Authentication

When a locate-request is sent to service supporting gateway 1 from a user wishing service W, application middleware server 13 of service supporting gateway 1 carries out a user authentication if the user who sent this locate-request is a subscriber of service W.

Application middleware server 13 stores subscriber data of users, namely subscribers of the service, for each service which a plurality of client service providers 3 provide. The subscriber data has a certification information to verify the user validity, information about acts allowed to the user. By these data, application middleware server 13 carries out user authentication.

STEP Sa2: Approval

When user validity is verified by user authentication, the user can send a desired request to service supporting gateway 1. Application middleware server 13 sees subscriber data for service W and judges if the request from the user is an act allowed to the user. This judgement is named here as approval.

STEP Sa3: Measurement of Self-Location

In a case where a locate-request for searching the self-location is allowed to a user of service W, when service supporting gateway 1 receives a locate-request from the user, it locates the current location of the user with a suitable method for the mobile device of the user.

Step Sa4: Management of the amount of access

When service supporting gateway 1 carries out self-location searching for service W and registers it in location information server 12, service supporting gateway 1 measures the amount of access for them and saves it into an unshown database for charging. This management of the amount of access is carried out for each service given by service supporting gateway 1.

Step Sa5: Change of Location Representing Format

Service supporting gateway 1 changes the representing format of the user's location information into a representing format appropriate to service W. For example, STEP Sa5 includes a changing process from a location information expressed by latitude and longitude into a location information expressed by address.

STEP Sa6: Notification

Service supporting gateway 1 sends the location information of the user to locating target person or service provider 3 that is a provider of service W.

STEP Sa7: Encryption

When sending the location information, service supporting gateway 1 conducts an encryption to ensure security by using Secure Sockets Layer (SSL).

This encryption is not necessary when the system has security. For example, when service supporting gateway 1 and a service provider are connected by a private line, encryption is not necessary. The same thing can be said in following other services. When security is secured in the services, encryption is not necessary.

C-2. Service Supporting Tasks for Self-Location Registration Service (FIG. 7)

Figure 7:
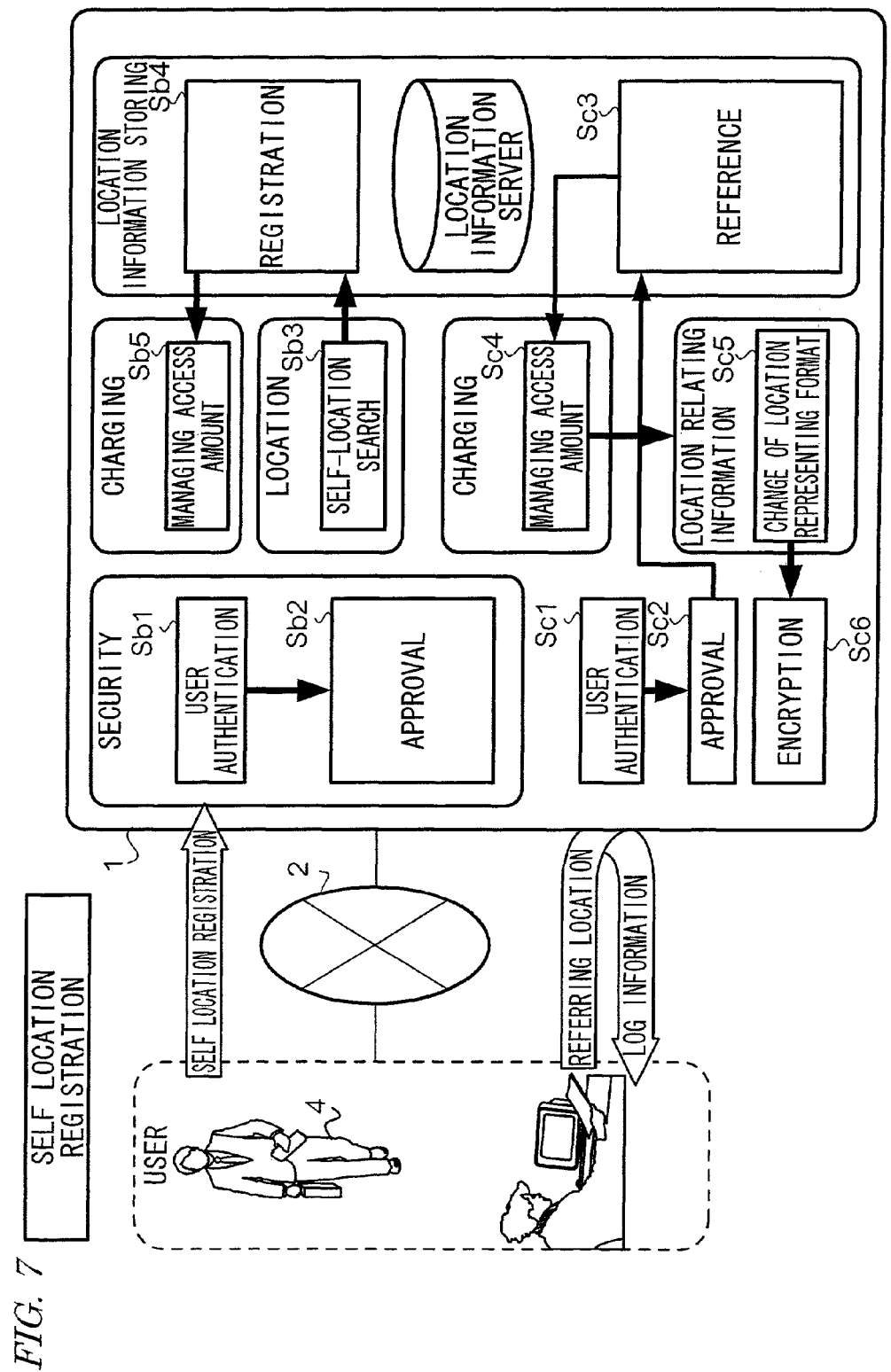
FIG. 7 is a diagram showing details of service supporting tasks in the self-location registration service provided by the embodiment.

FIG. 7 shows service supporting tasks executed by service supporting gateway 1 when service provider 3 provides a certain corporation with a service (referred to service X here) belonging to a self-location registration service. The service supporting tasks are comprised of a service supporting task for self-location registration demanded by a corporate employee (a locating target person) and a service supporting task for referring to the location information demanded by a corporate manager (user).

<Service Supporting Task for Self-Location Registration>

STEP Sb1: User Authentication

When service supporting gateway 1 receives a locate-request from an employee of a corporation that is a subscriber of service X, application middleware server 13 of service supporting gateway 1 carries out user verification if the locating target person sending the locate-request is an employee of corporation which is a subscriber of service X.

Application middleware server 13 has subscriber data for each employee of a corporation which is a subscriber of service X. This subscriber data includes a certification information for verifying validity of the corporate employee, information about acts allowed to the employee. Application middleware server 13 carries out user authentication by using the subscriber data.

STEP Sb2: Approval

When service supporting gateway 1 receives a request from a locating target person, service supporting gateway 1 judges if the request is for an act allowed to the locating target person.

STEP Sb3: Measurement of Self-Location

When service supporting gateway 1 receives a locate-request, it locates a locating target person by using locating unit 1A. This locating process is distributed to a locating means suitable to the mobile device of the locating target person.

STEP Sb4: Registration

Service supporting gateway 1 registers the location information, the locating time, the locating method, and other additional data obtained in the self-location with location information server 12.

STEP Sb5: Charging Management

When service supporting gateway 1 is accessed for searching self-location in service X, it stores the amount of accesses in the database for charging.

<Service Supporting Task for Location Searching>

STEP Sc1: User Authentication

Service provider 3 that provides service X transmits to service supporting gateway 1 a request for referring to location information of an employee of a certain corporation that is a subscriber of service X. This transmission of request for referring may be carried out periodically or when a manager of a corporation which is a subscriber of service X requests to a provider of service X. What is a trigger of sending to service supporting gateway 1 a request for referring to location information depends on the agreement about service X concluded between a corporation and service supporting gateway 1.

When this request for referring to location information is sent to service supporting gateway 1, application middleware server 13 verifies if the sender is a proper provider of service X.

STEP Sc2: Approval

When service supporting gateway 1 receives a request from the provider of service X whose validity has been verified, service supporting gateway 1 judges whether the request is for an approved act.

STEP Sc3: Reference

In this explanation, service provider 3 that is a provider of service X has access to location information server 12 to see location information of corporate employee. Therefore, this request for referring to location information is allowed. By this, service provider 3 sends terminal identifiers of each mobile device of each corporate employee as keys. Service supporting gateway 1 reads out location information for the keys from location information server 12.

STEP Sc4: Management of the Amount of Access

When service supporting gateway 1 reads out the location information to provide service X as this from location information server 12, service supporting gateway 1 measures the amount of access incurred during the readout and saves it into a database for charging.

STEP Sc5: Change of Location Representing Format

Service supporting gateway 1 changes the representing format of the location information read out from location information server 12 if necessary. This change includes a change from latitude and longitude to address (character string). What kind of change is carried out depends on an agreement concluded in advance between the provider of service X and service supporting gateway 1.

STEP Sc6: Encryption

Service supporting gateway 1 encrypts the location information and sends it to service provider 3 that is a provider of service X.

C-3. Service Supporting Task for Self-Location Notification Service (FIG. 8)

Figure 8:
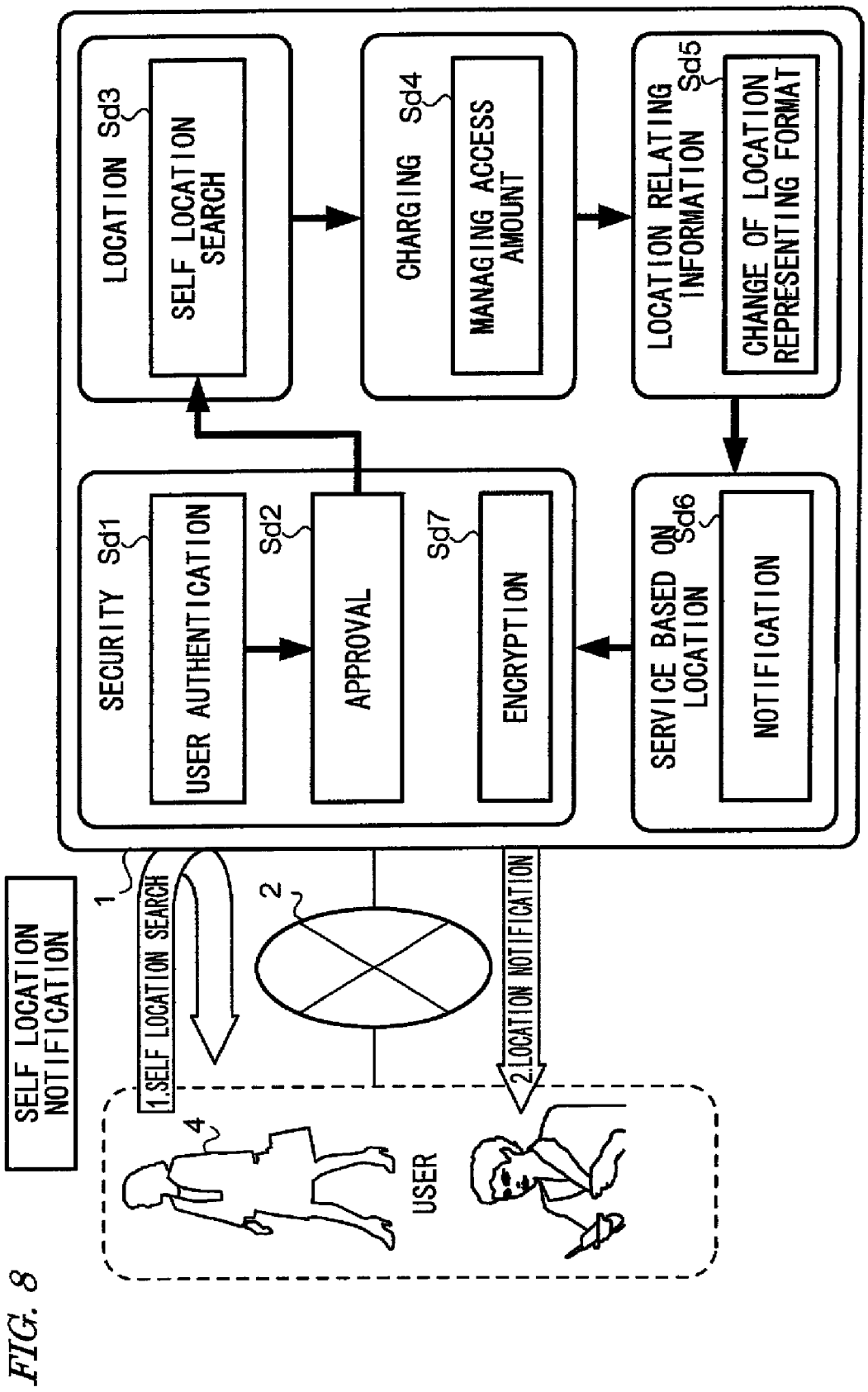
FIG. 8 is a diagram showing details of service supporting tasks in the self-location notification service provided by the embodiment.

FIG. 8 shows service supporting tasks executed by service supporting gateway 1 when a service provider 3 provides its user (namely a locating target person) with a certain service (referred to service Y here) belonging to self-location notification service. The service supporting tasks are comprised of the following processes.

STEP Sd1: User Authentication

When a locate-request is sent from a user wishing service Y to service supporting gateway 1, application middleware server 13 of service supporting gateway 1 verifies whether the user who sent the locate-request is a subscriber of service Y.

STEP Sd2: Approval

When validity of the user is verified, the user can send a desired request to service supporting gateway 1. Application middleware server 13 of service supporting gateway 1 sees the subscriber list for service Y and judges whether the request from the user is an act allowed to the user.

STEP Sd3: Measurement of Self-Location

When it is supposed that a locate-request is allowed to a user of service Y, when service supporting gateway 1 receives the locate-request from a user, it locates the user by using locating format suitable to the mobile device of the user.

STEP Sd4: Management of the Amount of Access

When searching the self-location is carried out for providing service Y, the amount of accesses (for example, the number of self-location searching) is measured and stored in the database for charging. This management of the number of accesses is carried out for each service given by service supporting gateway 1.

STEP Sd5: Change of Location Representing Format

Service supporting gateway 1 changes user's location information into a representing format appropriate to service Y. For example, changing from latitude and longitude into address (character string) is carried out.

STEP Sd6: Notification

Service supporting gateway 1 sends user's location information to service provider 3 that is a provider of service Y.

STEP Sd7: Encryption

When notifying, to ensure security, service supporting gateway 1 encrypts the location information and sends it.

C-4. Service Supporting Task for Other Person's Location Searching Service (FIG. 9)

Figure 9:
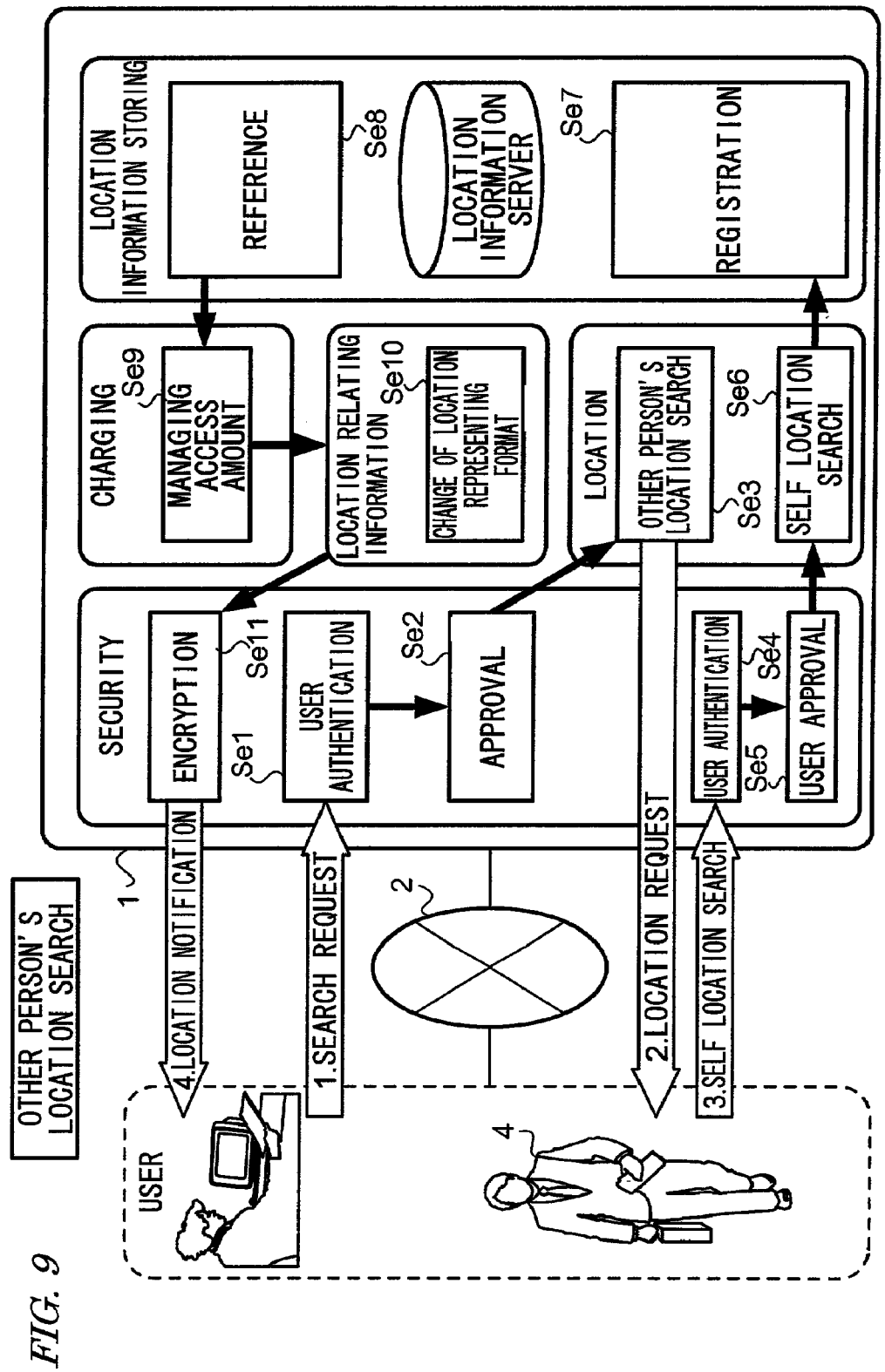
FIG. 9 is a diagram showing details of service supporting tasks in the other person's location searching service provided by the embodiment.

FIG. 9 shows a service supporting tasks executed by service supporting gateway 1 when a service provider 3 provides its users with a certain service (referred to service Z here) belonging to an other person's location searching service. This service supporting tasks is comprised of following processes.

STEP Se1: User Authentication

A user of the service Z sends to service provider 3 which is a provider of service Z a searching request of the current location of the user's locating target person. Service provider 3 that received the request sends to service supporting gateway a searching request for the current location of the locating target person. Application middleware server 13 of service supporting gateway 1 carries out user authentication to verify the validity of service provider 3 that sent the locating request.

STEP Se2: Approval

When validity of service provider 3 is verified by the user authentication, service provider 3 is able to send a desired request to service supporting gateway 1. Application middleware server 13 judges if the request from service provider 3 is an allowable act.

STEP Se3: Measurement of Other Person's Location

In this explanation, service provider 3 providing service Z is allowed to search the current location of locating target person of user of service Z. Therefore, about a request for the current location from this service provider 3, approval for approving this is made. As a result, service supporting gateway 1 demands a terminal identifier of the mobile device of the locating target person, pages the mobile device and sends a request for locating. As a result, locating unit 1A of service supporting gateway 1 and the mobile device exchange signals for locating the current location of the locating target person.

Then information indicating the current location of the locating target person is sent to service supporting gateway 1.

STEP Se4: User Authentication

Service supporting gateway 1 verifies the validity of the locating target person who sent information indicating the current location.

STEP Se5: Approval of User

Service supporting gateway 1 judges if the act of locating the current location and registration is allowed to the locating target person.

STEP Se6: Measurement of Self-Location

When the result of the judgement is positive, service supporting gateway 1 conducts correction of information of the current location when necessary (for example, a correction of latitude and longitude when location is carried out using DGPS), and generates location information of the locating target person.

STEP Se7: Registration

Service supporting gateway 1 registers the location information expressed such as by latitude and longitude obtained as above, together with the locating time, the locating method, and other additional information with location information server 12.

STEP Se8: Reference

Service supporting gateway 1 reads out from location information server 12 the location information of the locating target person who is searched for by service provider 3.

Note that these processes in STEP Se7 and Se8 are not necessarily carried out. Service supporting gateway 1 may send to service provider 3 the obtained location information together with the locating time, the locating method, and other additional information.

STEP Se9: Management of the Amount of Access.

When service supporting gateway 1 searches other person's location to provide service Z, service supporting gateway 1 measures the amount of access (for example, the number of searching times of other person's location) and saves it into a database for charging.

STEP Se10: Change of Location Representing Format

Service supporting gateway 1 changes the representing format of the location information of the user into a representing format appropriate to service Z. For example, changing from latitude and longitude into address (character string) is carried out.

STEP Se11: Encryption

Service supporting gateway 1 encrypts the location information of the locating target person and sends it to service provider 3 that is a provider of service Z.

D. Service Charge Collecting System

Next, service charge collecting methods used in the location information service supporting system of the embodiments will be described. There are three service charge collecting methods as follows.

D-1. First Method

Figure 10:
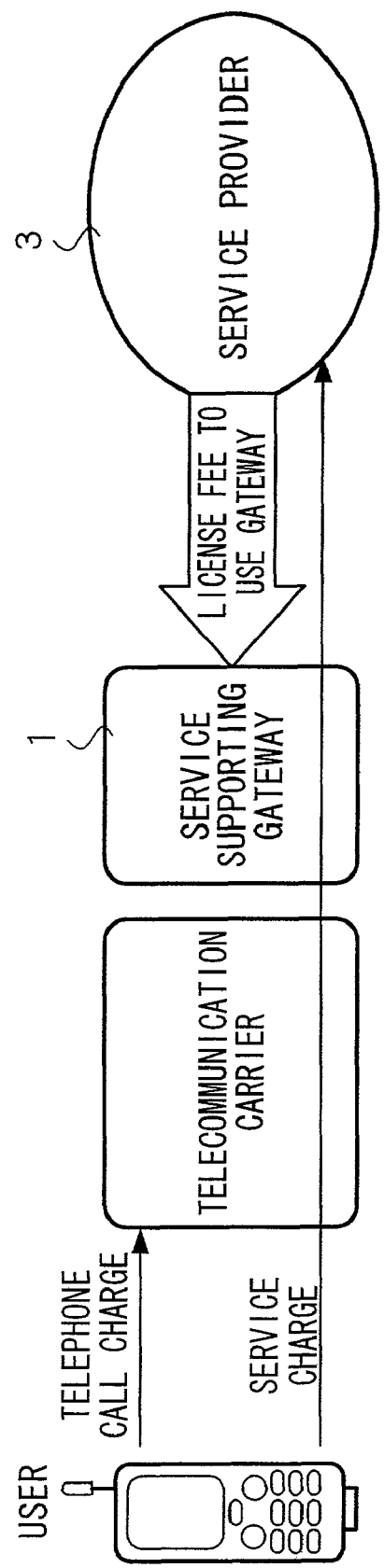
FIG. 10 is a diagram showing the first method for collecting service charge used in the location information service supporting system of the embodiment.

FIG. 10 is a diagram showing the first method of collecting service charge used in the location information service supporting system of the embodiment.

In this first method, a user who receives location information service pays the charge for telephone calls to the telecommunication carrier, and pays service charge to service provider 3 that provides location information service.

Since service provider 3 uses service supporting gateway 1 when providing location information service, service provider 3 pays the value for it, namely the license fee to use the gateway to the owner of service supporting gateway 1. The amount of license fee required to use the gateway is calculated based on the amount of accesses recorded by service supporting gateway 1 in the database for charging.

Note that a service charge collecting process by service supporting gateway 1 is not necessarily conducted by service supporting gateway 1. It is needless to say that, for example, a service charge collecting system set up separated from service supporting gateway 1 may conduct the process by request from service supporting gateway 1. The same thing can be said in the following second and third methods and modifications.

D-2. Second Method

Figure 11:
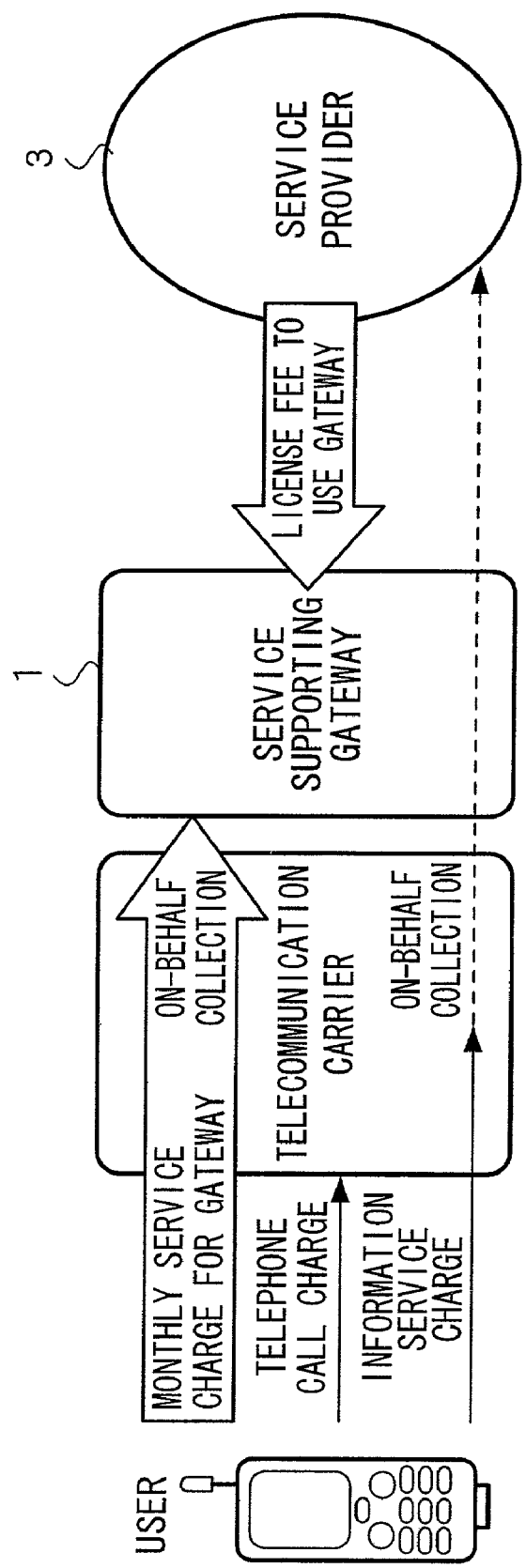
FIG. 11 is a diagram showing the second method for collecting service charge used in the location information service supporting system of the embodiment.

FIG. 11 is a diagram showing the second method of collecting service charge used in the location information service supporting system of the embodiment.

In this second method, an assumption is made that service provider 3 connected to service supporting gateway 1 directly by a private line distributes to a user receiving a self-location searching service a paid information relating to the location of the user via the private line and service supporting gateway 1.

In this case, the communication carrier collects the charge for telephone calls from its users, monthly service charge for service supporting gateway 1, and information service charge for paid information.

The communication carrier pays the monthly service charge collected from its users to service supporting gateway 1, and information service charge to service provider 3.

Since service provider 3 uses service supporting gateway 1 to obtain location information of users when delivering information relating to the location information, service provider 3 pays to the owner of service supporting gateway 1 a license fee to use the gateway.

Note that service supporting gateway 1 may collect information service charge together with collecting monthly service charge of service supporting gateway 1 directly from users. Then service supporting gateway 1 extracts a license fee to use service supporting gateway 1 by service provider 3 from the collected information charge, then pays the remained value to service provider 3.

D-3. Third Method

FIG. 12 is a diagram showing the third method of collecting service charge used in the location information service supporting system of the embodiment.

In this third method, advertisements provided by unshown advertisers are displayed on the mobile device of the locating target person. Service supporting gateway 1 collects advertising fees from the advertisers, and allots a part or all of the advertising fees to license fee for the use of the gateway.

In more detail, while service supporting gateway 1 is providing location information service to its user, it sends data for various advertisements to mobile device so that the mobile device displays the advertisement. Service supporting gateway 1 measures the time of displaying the advertisement and sends to the advertiser a bill based on the measured time. The advertiser pays the fee of advertisement to the owner of service supporting gateway 1. This fee of advertisement should be paid fundamentally to the service provider providing location information service.

Then the owner of service supporting gateway 1 extracts the license fee to use the gateway from the fee of advertisement. This license fee to use the gateway is calculated based on the number of accesses recorded by service supporting gateway 1 on the database for charging. The owner of service supporting gateway 1 pays the remaining value to service provider 3. The service provider carries out location information service using the advertisement fee collected as this.

E. Modifications

As described above, the present invention is not limited to the above embodiments, and various other forms can be included in its scope.

E-1. Modification 1

In the above embodiment, locating unit 1A locates mobile devices for various service supporting tasks carried out by service supporting gateway 1. That is, in the above embodiment, locating unit 1A has a kind of supporting role to service supporting gateway 1.

In this modification, locating unit 1A carries out a locating service independent from service supporting gateway 1. Note that locating unit 1A may be installed in service supporting gateway 1 as in the above embodiment. Also, locating unit 1A may be connected to service supporting gateway 1 by a private line, or a network connected to service supporting gateway 1 for example via the Internet. There can be many conceivable methods to connect locating unit 1A and service supporting gateway 1. In this modification, service supporting gateway 1 collects a service charge for locating on behalf of a manager of locating unit 1A to pay to the manager of locating unit 1A. The manager of locating unit 1A means a project implementing body that provides location service by operating and managing locating unit 1A and receives service charge for it to implement its service.

Service charge collecting methods in this modification are methods described in FIGS. 10 to 12 with changes of service provider 3 to the manager of locating unit 1A.

E-2. Modification 2

In the above embodiment, service supporting gateway 1 sends location information of locating target person to a destination designated by the service provider. This destination includes a mobile device besides a fixed terminal such as a personal computer. When sending location information, service supporting gateway 1 sends location information via a mobile network that gives service to the mobile device.

E-3. Modification 3

In the above embodiment, while a service provider is giving to a locating target person a service relating to location information, service supporting gateway 1 distributes an, advertisement to a mobile device of the locating target person. Besides distributing an advertisement to the mobile device of the locating target person as above, distributing to other destinations designated by a service provider may be possible.

E-4. Modification 4

As a charging method when a service provider collects service charge from users, fixed charging is possible besides measured charging. Also, it is possible to use both. For example, in an information providing service, until providing a certain amount of information, a fixed charge is used, and after that amount, measured charging is used by charging according to the amount of information provided.

E-5. Modification 5

In this modification, when carrying out approval in STEP Sa2 in FIG. 6, STEP Sb2 in FIG. 7, STEP Sd2 in FIG. 8, or STEP Se5, service supporting gateway 1 pages a mobile device of locating target person 4. Then service supporting gateway 1 sends to the mobile device a query if locating can be carried out. When service supporting gateway 1 receives a positive answer from the mobile device saying that locating can be conducted, locating unit 1A locates the locating target person. This modification becomes easier-to-use by adding an upgrade to a mobile device. That is, a configuration upgrade is added to the mobile device as follows; when a prescribed setting procedure is carried out, and after that when there is the query from service supporting gateway 1, the mobile device automatically returns an answer saying that locating can be carried out or that locating cannot be carried out. By this, locating target person 4 need not conduct a replying operation to a query from service supporting gateway 1; thereby reducing the burden of locating target person 4.

E-6. Modification 6

In this modification, location information server 12 of service supporting gateway 1 stores locating target person information containing his or her hobby, family structure, and usual traveling method used by locating target person in relation with location information. Then while service provider 3 is giving a location information service to locating target person 4, based on locating target person information of locating target person 4, service supporting gateway 1 selects a advertisement suitable for the hobby, family structure, or traveling method of locating target person 4 to send to the mobile device of locating target person 4.

E-7. Modification 7

In this modification, the mobile device of locating target person 4 has an emergency button. A user, a locating target person, presses this emergency button when receiving a self-location notification service such as notifying the self-location to an emergency center to ask for a rescue team. In response to this press of the emergency button, the mobile device communicates with service supporting gateway 1 for self-location searching and self-location communication (refer to FIGS. 4 and 8). When service supporting gateway 1 obtains the location information by this communication, service supporting gateway 1 sends the location information of locating target person 4 to the emergency center without using a service provider giving a self-location notification service, and asks to dispatch a rescue team.

E-8. Modification 8

In this modification, service supporting gateway 1 carries out both the processes for self-location registration service and self-location notification service. That is, when, for example, providing a service of asking to dispatch a rescue team as described in above modification 7, service supporting gateway 1 periodically obtains location information of locating target person 4 who receives the service to store in location information server 12. Then when locating target person 4 presses the emergency button of the mobile device, the mobile device sends a self-location searching request accompanying a dispatch request for a rescue team to service supporting gateway 1. Service supporting gateway 1 reads out location information of locating target person 4 who is the sender of this dispatch request to send to an emergency center together with the dispatch request.

E-9. Modification 9

In the above embodiment, when service supporting gateway 1 gives a self-location registration service, service supporting gateway 1 periodically obtains location information of locating target person 4 and registers it in location information server 12. In this modification, service supporting gateway 1 calculates rough moving direction and speed of locating target person from this periodically registered location information of locating target person 4. Then service supporting gateway 1 sends, as a traffic information, these moving direction and speed together with location information of locating target person 4 to a destination designated by a service provider. The destination may be a transportation organization or a concert provider. Based on the traffic information sent from service supporting gateway 1 as described, the transportation organization is able to, for example, estimate an occurrence of traffic jam on a certain road and provide the service of delivering information about detours to mobile devices of locating target persons who can be in the traffic jam. Also, the concert provider is able to grasp the number of persons coming to a concert place based on the traffic information sent as above.

E-10. Modification 10

In this modification, when a location information arrives at a designated destination, service supporting gateway 1 can make a report about it to a locating target person. This modification will be described by using services described in modifications 4 or 5. First, a locating target person presses an emergency button, then locating is carried out and the location information of the locating target person arrives at a destination of the location information of the locating target person, namely at an emergency center. When service supporting gateway 1 confirms the arrival of the location information to the emergency center, service supporting gateway 1 sends to the mobile device of the locating target person information indicating arrival. The mobile device receives the information, and outputs a character, image, or voice indicating that the location information of the locating target person has arrived at the emergency center. By viewing this, the locating target person is able to wait for a rescue team without anxiety.

E-11. Modification 11

In the above embodiment, location information server 12 has a changing function of latitude-longitude information into that of an address. In this modification, the changing function of location information server 12 is enhanced. That is, location information server 12 of this modification has a changing function of changing latitude-longitude information into location information by following other formats.

a. neighboring map of the location specified by latitude-longitude information
b. telephone numbers of the region specified by latitude-longitude information
c. postcodes of the region specified by latitude-longitude information
d. landmark indicating a building or facilities located in a region specified by latitude-longitude information
e. uniform resource locator (URL) of a site that provides information relating to a region specified by latitude-longitude information
f. voice information guiding a shopping center or a public facility specified by latitude-longitude information Service provider 3 uses this changing function of location information server 12 to obtain a location information with the desired format and to utilize it for its location information service.

E-12. Modification 12

In this modification, service supporting gateway 1 has a multi-language changing function such as changing from Japanese to English, from English to Japanese, and from Japanese to Chinese. When a service provider want service supporting gateway 1 to send location information with a certain language expression to the service provider or a designated destination, the service provider registers in advance to service supporting gateway 1 in what language the service provider wants the location information to be sent. When service supporting gateway 1 obtains location information with a language expression for a certain service provider, service supporting gateway 1 changes the language of the location information into a language registered by the service provider, and then sends the location information after the language change to the service provider or a designated destination.

E-13. Modification 13

Among service providers, some periodically manage services of buses or trains. This modification is aimed at these service providers. For example, a bus-service company that is a service provider sets mobile devices in one or more buses that is regarded as a locating target person. In service supporting gateway 1, time tables showing which bus should arrive at which bus stop at what time is registered in advance. This time table is registered in service supporting gateway 1 by bus-service companies. Service supporting gateway 1 keeps comparing the current time and time tables. When service supporting gateway 1 recognizes that a time has come when a certain bus should arrive at a certain bus stop, service supporting gateway 1 locates the mobile device installed in the bus, and sends the location information to a management center designated by the bus-service company. The management center can grasp a traveling status of each bus based on the location information thus sent.

E-14. Modification 14

When GPS is used for locating, location information with height information as well as latitude and longitude information can be obtained. Therefore, a service provider receiving location information with information of the height of the location can give a location information service for that height. For example, when a locating target person is on airplane or climbing a mountain, the correct weather information for that height is sent to the locating target person; this kind of service is conceivable.

E-15. Modification 15

In the above embodiment, service supporting gateway 1 provides a locating target person with an advertisement given by an advertiser when the service provider is giving a service relating to location information. This does not prevent service supporting gateway 1 itself from becoming an advertiser.

E-16. Modification 16

This modification relates to a large scale network system with each of a plurality of service supporting gateway 1 being installed in different networks of a plurality of networks. In this modification, service supporting gateway a in network A is able to give location information relating service to a locating target person to a service provider in network B by receiving a service from service supporting gateway b in network B. To illustrate, for a service provider using network A, service supporting gateway b obtains location information of a locating target person via network B to send to service supporting gateway a. Service supporting gateway a sends this location information to a destination designated by the service provider. In this modification, approval of locating target person is carried out by service supporting gateway b in network B where the locating target person belongs. Therefore, service supporting gateway a in network A does not need to conduct a process for approval.

E-17. Modification 17

In this modification, when there is a locate-request, a mobile device sends location information with information indicating some kind of status such as normal, abnormal or stop to service supporting gateway 1. Service supporting gateway 1 distributes location information to its destination based on the information indicating the status in the location information. For example, when location information from a mobile device of a bus driver has information indicating normal state, service supporting gateway 1 sends the location information to a bus service management center, and when information indicating abnormal state is included, service supporting gateway 1 sends the location information to an emergency center; this kind of distribution function may be incorporated in service supporting gateway 1.

E-18. Modification 18

In the above embodiment, when, for example, a service provider gives information relating to location information, service supporting gateway 1 collects from users of the service service charge relating to the information provided on behalf of the service provider. However, besides the service charge on the information provided, when service provider sells a product to its user, service supporting gateway may collect the money for the product.

The invention claimed is:

1. A location information service supporting method comprising:
   a location information obtaining service in which a location information service supporting gateway, situated between a first network including a mobile network and a second network, receives information from a mobile device in the first network used to indicate locating capability of the mobile device, selects at least one locating method, from a plurality of locating methods, for locating the mobile device based on the received information from the mobile device, and obtains a location information of the mobile device using the selected locating method indicating the location of a locating target person, the mobile device accompanied with the locating target person, so that a service provider provides a service relating to the location of the locating target person; and
   a location information sending service in which the location information service supporting gateway sends the location information to a destination designated by the service provider via the first or the second network.

2. A location information service supporting method of claim 1,
   wherein, in the location information sending service, the location information service supporting gateway sends the location information to the service provider.

3. A location information service supporting method of claim 1,
   wherein the second network includes a mobile network, and
   wherein, in the location information sending service, the location information service supporting gateway sends the location information to a destination designated by the service provider via this mobile network.

4. A location information service supporting method of claim 1,
   wherein, on behalf of the service provider, the location information service supporting gateway certifies a locating target person or a person who receives a service.

5. A location information service supporting method of claim 1,
   wherein, on behalf of the service provider, the location information service supporting gateway determines if locating a locating target person is possible.

6. A location information service supporting method of claim 1,
   wherein, in the location information sending service, the location information service supporting gateway changes the format of the location information into a format suitable for a service that uses the location information, and sends to a destination designated by a service provider that provides this service.

7. A location information service supporting method of claim 1,
   wherein, in the location information sending service, the location information service supporting gateway changes the format of the location information into a format suitable for a service that uses the location information, and sends to a service provider that provides this service.

8. A location information service supporting method of claim 1,
   wherein the location information service supporting gateway collects a service charge for the location information obtaining service and the location information sending service from at least one of the service providers, the locating target person, or a target person of service by the service provider.

9. A location information service supporting method of claim 1,
   wherein the location information service supporting gateway accumulates, for each of the service, a number of task processes incurred due to the provision of the service, and collects a service charge according to the number of the task processes from at least one of the service providers that provide the service, the locating target person, or a target person of service by the service provider.

10. A location information service supporting method of claim 1,
    wherein at least one of the location information service supporting gateway or a communication carrier that provides a wireless communication service to the mobile device collects a service charge for a service provided by the service provider on behalf of the service provider.

11. A location information service supporting method of claim 1,
    wherein the location information service supporting gateway provides an advertisement to a mobile device accompanying the locating target person, collects advertisement fee from the advertiser and pays to the service provider the advertisement fee as all or a part of the service charge for the service provided by the service provider.

12. A location information service supporting method of claim 1,
    wherein at least one of the location information service supporting gateway or a communication carrier that provides a wireless communication service to the mobile device collects, on behalf of a manager of the selected locating method, a locating fee due to a location by the selected locating method.

13. A location information service supporting method of claim 1,
    wherein the location information service supporting gateway carries out the location information obtaining service and the location information sending service on schedule determined in advance.

14. A location information service supporting method of claim 1,
    wherein the location information service supporting gateway periodically carries out the location information obtaining service to acquire a moving direction and a moving speed of the locating target person, and, in the location information sending service, sends the moving direction and the moving speed together with the location information.

15. A location information service supporting method of claim 1,
wherein, in the location information sending service, the location information service supporting gateway checks the reaching of location information to a destination and sends an arrival notification to a mobile device of the locating target person.

16. A location information service supporting gateway situated between a first network including a mobile network and a second network comprising:
a location information obtaining means for receiving information from a mobile device in the first network used to indicate locating capability of the mobile device, for selecting at least one locating method, from a plurality of locating methods, for locating the mobile device based on the received information from the mobile device, and for obtaining a location information of the mobile device using the selected locating method indicating the location of a locating target person, the mobile device accompanied with the locating target person, so that a service provider provides a service relating to the location of the locating target person; and
a location information obtaining service in which a location information service supporting gateway, situated between a first network including a mobile network and a second network, a location information sending means for sending the location information to a destination designated by the service provider via the first or the second network.

17. A location information service supporting gateway of claim 16, further comprising:
a means for certifying a locating target person or a person who receives a service on behalf of the service provider.

18. A location information service supporting gateway of claim 16, further comprising:
a means for changing a format of the location information into a format suitable for a service that uses the location information.

19. A location information service supporting gateway of claim 16, further comprising:
an accumulating means for determining at least one of the amount of processes accumulated due to obtaining location information by the location information obtaining means or due to sending location information by the location information sending means; and a collecting means for collecting a service charge according to the amount of accumulated processes from at least one of the service providers, the locating target person, an owner of the locating means, or a target person of the service.

20. A location information service supporting method of claim 1, wherein the location information service supporting gateway determines a type of mobile device based on the information received from the mobile device; and
wherein the location information service supporting gateway selects the locating method based on the determined type of mobile device.

21. A location information service supporting method of claim 20, wherein the location information service supporting gateway receives the information used to indicate locating ability of the mobile device in a locate-request from the mobile device.

22. A location information service supporting method of claim 20, wherein the type of mobile device comprises a mobile device with a GPS function; and
wherein the locating method selected uses as an input latitude and longitude information provided by the GPS function of the mobile device in order to determine a location of the mobile device, the determined location of the mobile device being different from the latitude and longitude information provided by the GPS function.

23. A location information service supporting gateway of claim 16, wherein the location information obtaining means determines a type of mobile device based on the information received from the mobile device; and
wherein the location information obtaining means selects the locating method based on the determined type of mobile device.

24. A location information service supporting gateway of claim 23, wherein the location information obtaining means receives the information used to indicate locating ability of the mobile device in a locate-request from the mobile device.

25. A location information service supporting gateway of claim 23, wherein the type of mobile device comprises a mobile device with a GPS function; and
wherein the locating method selected uses as an input latitude and longitude information provided by the GPS function of the mobile device in order to determine a location of the mobile device, the determined location of the mobile device being different from the latitude and longitude information provided by the GPS function.

* * * * *